US008739942B2

(12) United States Patent
Lafitte et al.

(10) Patent No.: US 8,739,942 B2
(45) Date of Patent: Jun. 3, 2014

(54) CONTROLLED-FRICTION LINEAR DEVICE IN WHICH A PRESS FORCE IS APPLIED PERPENDICULAR TO THE MOVEMENT

(75) Inventors: Arnaud Lafitte, Chaville (FR); Sabien Verlyck, Auterrive (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 116 days.

(21) Appl. No.: 13/254,124

(22) PCT Filed: Apr. 6, 2010

(86) PCT No.: PCT/EP2010/054537
§ 371 (c)(1),
(2), (4) Date: Aug. 31, 2011

(87) PCT Pub. No.: WO2010/115894
PCT Pub. Date: Oct. 14, 2010

(65) Prior Publication Data
US 2011/0311171 A1 Dec. 22, 2011

(30) Foreign Application Priority Data
Apr. 6, 2009 (FR) ..................................... 09 01685

(51) Int. Cl.
*B65H 59/10* (2006.01)
*F16F 7/10* (2006.01)
(52) U.S. Cl.
USPC ........................................... 188/67; 188/166

(58) Field of Classification Search
USPC .................................. 188/67, 166, 171, 381
See application file for complete search history.

(56) References Cited

U.S. PATENT DOCUMENTS

| 1,463,284 | A | * | 7/1923 | Lang ............................. 188/129 |
| 1,825,086 | A | * | 9/1931 | Ohlendorf ..................... 293/132 |
| 3,134,462 | A | | 5/1964 | Messinger |
| 3,866,720 | A | | 2/1975 | Wallerstein, Jr. |
| 4,419,924 | A | * | 12/1983 | Peter et al. ...................... 188/67 |
| 2008/0256986 | A1 | * | 10/2008 | Ackermann et al. ............ 68/23.1 |

FOREIGN PATENT DOCUMENTS

DE  27 35 779 A1  2/1979

* cited by examiner

*Primary Examiner* — Thomas J Williams
(74) *Attorney, Agent, or Firm* — Sughrue Mion, PLLC

(57) ABSTRACT

A controlled-friction device comprising a first element having a second element mounted thereon to slide in a sliding direction, and friction retaining means arranged to exert between the two elements an opposing force against relative movement of the two elements. The friction retaining mechanism comprises a friction member mounted securely to the first element to rub against the second element via a friction surface extending parallel to the sliding direction, a presser member for exerting a thrust force on the friction member, urging the friction member against the second element in a direction normal to the relative movement of the elements, and a linkage linking the friction member to the first element causing the friction member to separate from the second element during movement in either direction of the second element relative to the first element.

6 Claims, 3 Drawing Sheets

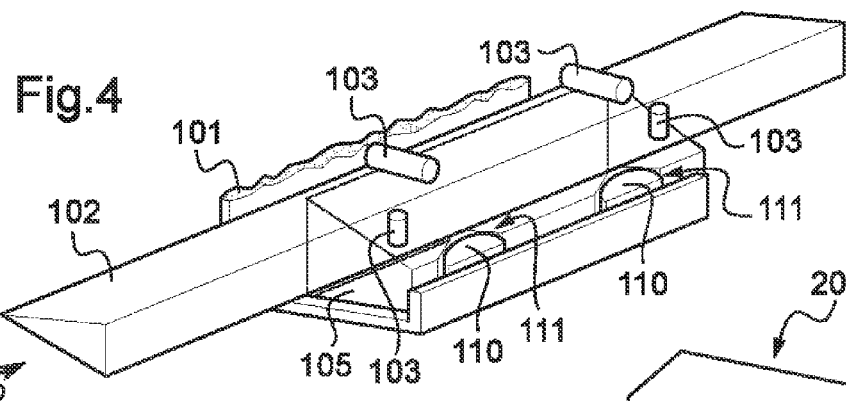
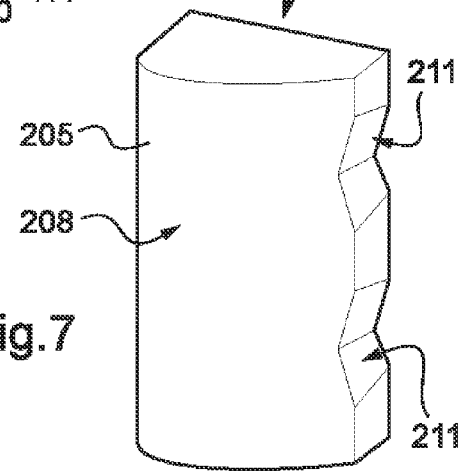
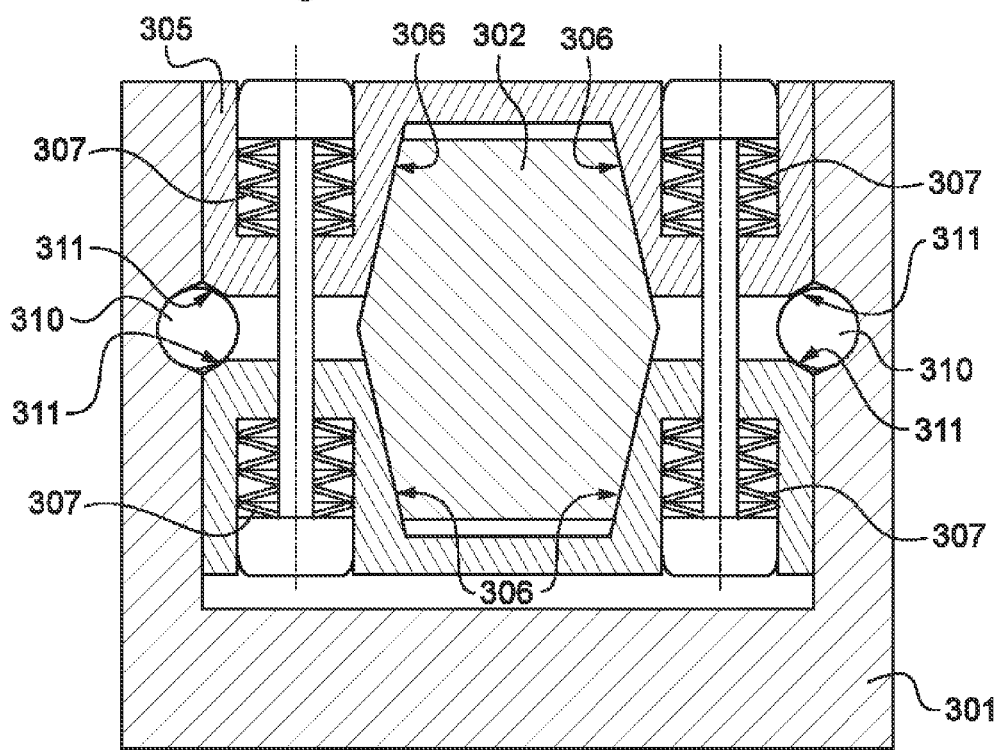

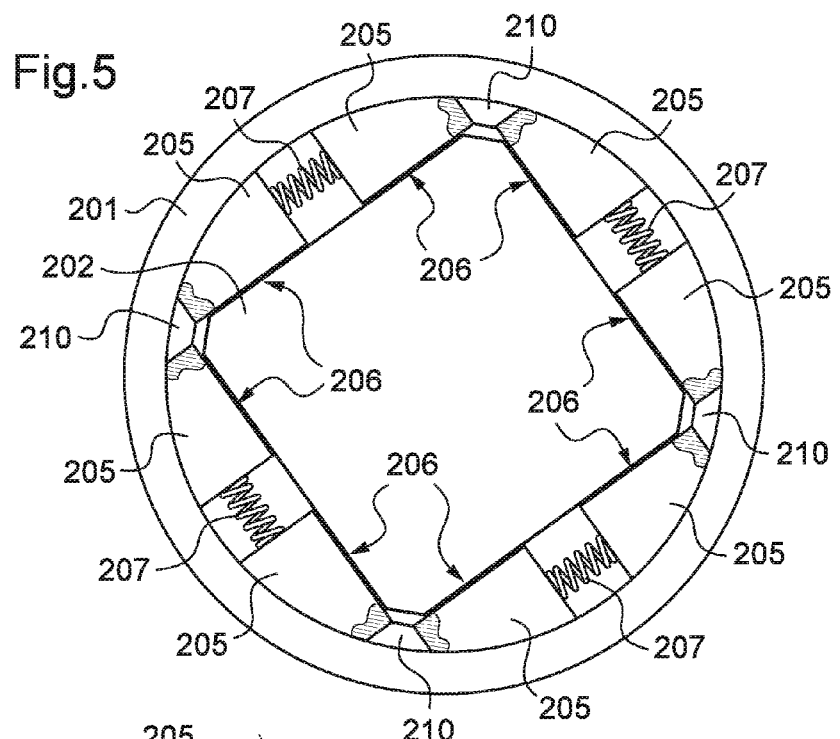
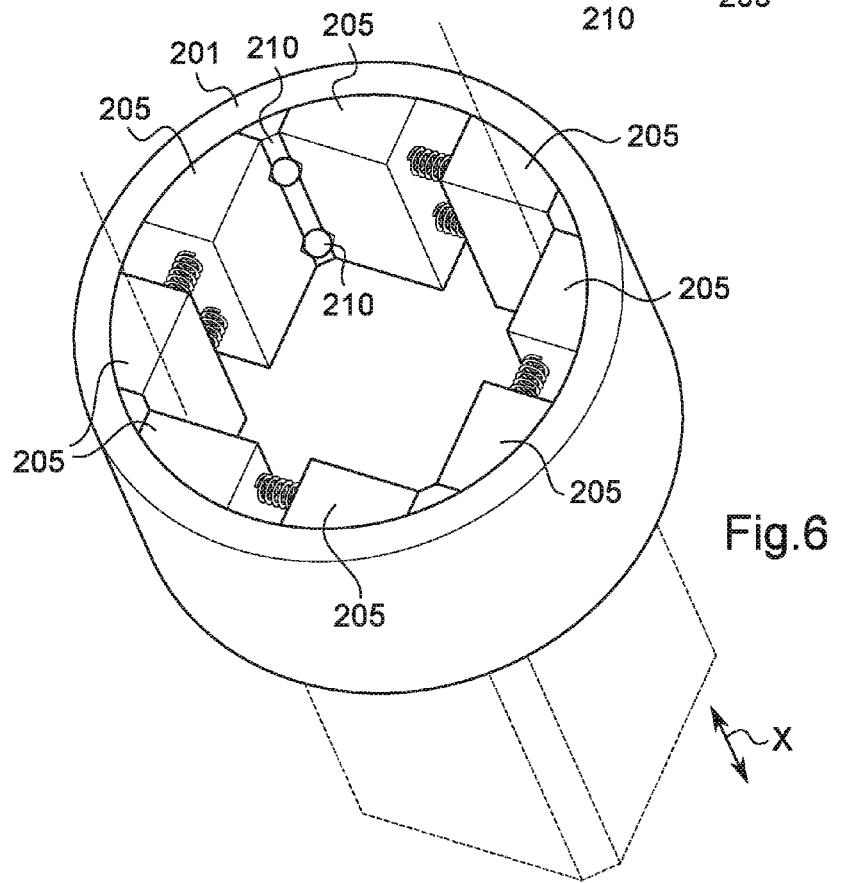

CONTROLLED-FRICTION LINEAR DEVICE IN WHICH A PRESS FORCE IS APPLIED PERPENDICULAR TO THE MOVEMENT

CROSS REFERENCE TO RELATED APPLICATIONS

This application is a National Stage of International Application No. PCT/EP2010/054537, filed on Apr. 6, 2010, which claims priority from French Patent Application No. 09 01685, filed on Apr. 6, 2009, the contents of all of which are incorporated herein by reference in their entirety.

The invention relates to a controlled-friction device.

TECHNOLOGICAL BACKGROUND OF THE INVENTION

Document FR 2 905 997 discloses a controlled-friction device having first and second elements mounted to move relative to each other in a sliding direction, a friction member being arranged between the two elements and urged towards a wedging position by a presser member so that in one direction of relative movement between the elements along the travel direction, it prevents movement of the two elements, and in the other direction of relative movement, it exerts an opposing friction force on the two elements that depends on the stress imparted to the wedge member by the presser member.

For that purpose, the friction member includes a friction surface rubbing against one of the elements, and a bearing surface bearing against the other element, those two surfaces being at an angle to each other.

That device has the drawback of operating in one direction only, since the friction member acts as a wedge presenting relative movement in one of the directions.

In the same document, rotary devices are shown that operate in both directions of rotation.

OBJECT OF THE INVENTION

An object of the invention is to provide a device enabling relative sliding to take place between two elements in both directions, taking inspiration from the solutions adopted for the rotary devices.

BRIEF SUMMARY OF THE INVENTION

In order to achieve this object, there is provided a controlled-friction device comprising a first element having a second element mounted thereon to slide in a sliding direction, and friction retaining means arranged to exert between the two elements an opposing force against relative movement of the two elements, the friction retaining means comprising:
 a friction member mounted securely to the first element to rub against the second element via a friction surface extending parallel to the sliding direction; and
 a presser member for exerting a thrust force on the friction member, urging the friction member against the second element in a direction normal to the relative movement of the elements;
 wherein the retaining means comprise link means linking the friction member to the first element causing the friction member to separate from the second element during movement in either direction of the second element relative to the first element.

Thus, the thrust exerted by the presser member contributes to generating an opposing force between the second element and the friction member, which force retains the second element against the first element. Nevertheless, if the force exerted on the second element increases, then it entrains the friction member a little and the link means cause the friction member to separate progressively until the second element is released and is capable of moving relative to the first element against an opposing friction force that depends essentially on the thrust exerted by the presser member.

It is then very simple to make the device symmetrical. It suffices that the link means give rise to separation when the second element is moved in either of the directions relative to the first element.

In a particular embodiment of the invention, the friction surface extends obliquely relative to a thrust direction of the presser member pressing against the friction member. This oblique arrangement serves to increase the thrust force exerted by the presser member, thereby increasing the opposing force.

BRIEF DESCRIPTION OF THE FIGURES

The invention can be better understood in the light of the description of the accompanying figures, in which:
FIG. 4 is a partially cutaway perspective view of the FIG. 3 device;
FIG. 5 is a partially cutaway plan view of a third particular embodiment of the invention;
FIG. 6 is a perspective view of the FIG. 5 device, with the second element being represented merely by dashed lines;
FIG. 7 is a detail view of a friction pad fitted to the device shown in FIGS. 5 and 6;
and
 FIG. 8 is a section view of a controlled-friction device in a fourth particular embodiment of the invention.

DETAILED DESCRIPTION OF THE FIGURES

Figure 1:
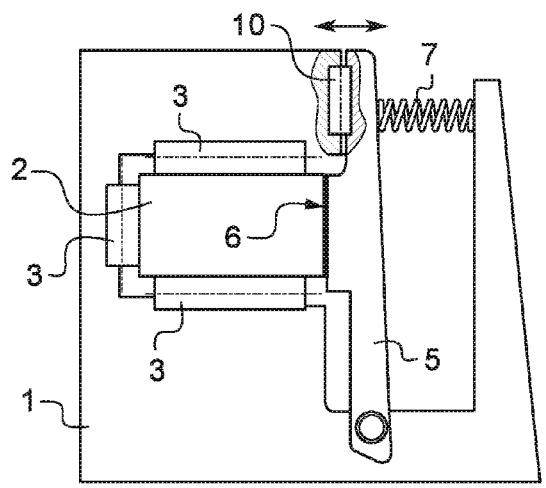
FIG. 1 is a partially cutaway face view of a controlled-friction device in a first particular embodiment of the invention.
Figure 2:
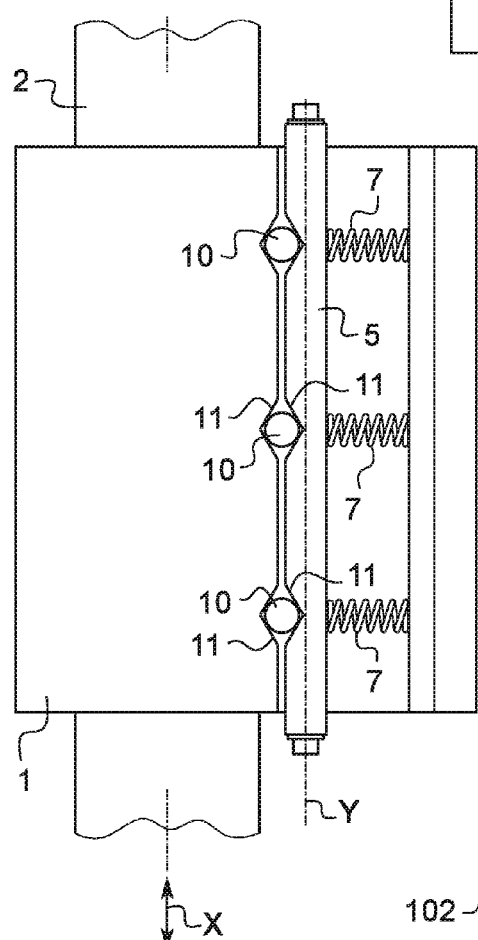
FIG. 2 is a plan view of the FIG. 1 device.

With reference to FIGS. 1 and 2, and in accordance with a first embodiment, the device comprises a first element in the form of a body 1 in which the second element, here a slider 2, is mounted to slide in a sliding direction X, seen end-on in FIG. 1. Rollers 3 are arranged between the body 1 and the slider 2 in order to facilitate this sliding. The device includes a friction member in the form of a flap 5 hinged to the body 1 about a hinge axis Y parallel to the direction X. The hinge is arranged to enable the flap 5 to move (a little) relative to the body 1 parallel to its hinge axis Y.

The flap 5 includes a friction surface 6 parallel to the sliding direction and urged by a presser member towards the slider 2 in order to rub thereagainst, the presser member in this example comprising a plurality of coil springs 7 arranged between the body 1 and the flap 5.

Finally, link means are arranged between the body 1 and the flap 5 to hold the flap on the body 1 while causing the flap to move away from the slider 2 against the thrust force generated by the springs 7 during movement of the flap 5 relative to the body 1. For this purpose, the link means comprise rollers 10 that are placed in cavities formed by facing half-cavities 11 forming indentations in the body 1 and the flap 5, each half-cavity presenting two slopes.

The device operates as follows. When an attempt is made to move the slider 2 relative to the body 1, the slider 2 moves a little, entraining the flap 5 therewith until the rollers 10 come into contact with opposing half-slopes in the half-cavities 11. By further increasing the force exerted on the slider, the rollers 10 progressively force the flap 5 to move away from the slider 2 against the thrust exerted by the springs 7 until the flap 5 is far enough away to cease to be capable of holding the slider 2. The slider then moves relative to the body 1 against an opposing friction force exerted by the flap 5. The opposing friction force results from equilibrium being reached by the flap between the action of the rollers 10 tending to move flap 5 away from the slider 2, and the thrust from the springs 7 tending to press the flap 5 against the slider 2. The device operates in this way in both travel directions, with the slopes of the pairs of half-cavities 11 causing the friction member to be released in either direction.

Figure 3:
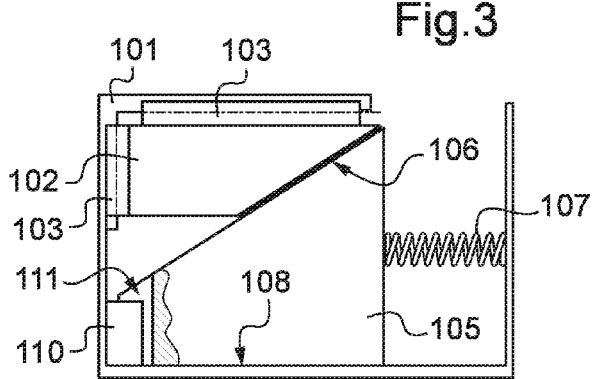
FIG. 3 is a face view of a controlled-friction device in a second particular embodiment of the invention.

With reference to FIGS. 3 and 4, and in accordance with a second particular embodiment of the invention, the device includes a first element 101 in the form of a body 1 in which a second element 102 is mounted to slide along a sliding direction X, seen end-on in FIG. 3.

Rollers 103 are located between the body 101 and the slider 102 in order to facilitate this sliding. The device includes a friction member in the form of a wedge 105. The wedge 105 possesses a friction surface 106 that extends parallel to the sliding direction and that is urged towards the slider 102 by a presser member comprising a plurality of coil springs 107. The wedge 105 also includes a bearing surface 108 bearing against the first element and forming an angle with the friction surface 106. It thus exerts wedge-blocking, but unlike the sliding device shown in document FR 2 905 997, the blocking does not act directly in the sliding direction, but perpendicularly thereto.

It should be observed at this point that the friction surface is no longer perpendicular to the thrust direction of the spring member, as in the first embodiment, but rather it is oblique. For a given thrust force, this arrangement makes it possible to obtain a greater friction force on the slider 102. The normal force exerted on the friction surface is then balanced by a bearing force between the wedge 105 and the first element 101 via the bearing surface 108.

Finally, the link means are arranged between the body 101 and the wedge 105 in order to hold the wedge 105 against the body 101 while causing the wedge to move away from the slider 102 against the thrust force generated by the coil springs 107 while the wedge 105 is being moved relative to the body 101. For this purpose, the link means include semicircular obstacles 110 that are secured to the body 101 and that are engaged in facing half-cavities 111 forming indentations in the wedge 105, each half-cavity 111 presenting two slopes.

The device operates as follows. When an attempt is made to move the slider 102 relative to the body 101, the slider 102 moves a little and entrains therewith the wedge 105 until the semicircular obstacles 110 come into contact with one of the half-slopes in the corresponding half-cavities 111. By further increasing the force exerted on the slider 102, the obstacles 110 co-operating with the facing half-slopes force the wedge 105 progressively away from the slider 102 against the thrust exerted by the spring member 107 until the wedge 105 is far enough away to cease to be capable of holding the slider 102. The slider then moves relative to the body 101 against an opposing friction force exerted by the wedge 105. The opposing friction force results from equilibrium being achieved by the wedge between the action of the obstacles 110 tending to move the wedge 105 away from the slider 102 and the thrust from the springs 107 tending to press the wedge 105 against the slider 102. The device operates in this way in both travel directions.

With reference to FIGS. 5 and 6, and in accordance with a third particular embodiment of the invention, the device comprises a first element in the form of a sleeve 201 in which a second element, here a rod 202 of square section with chamfered corners, is mounted to slide in a sliding direction X, seen end-on in FIG. 5.

In this example, the friction member comprises eight friction pads 205 arranged around the rod 202. As can be seen in FIG. 7, each friction pad has a friction surface 206 that rubs against one of the four facets of the rod 202, and a bearing surface 208 of circularly cylindrical shape bearing against the inside face of the sleeve 201. In this example the presser member is in the form of coil springs 207 arranged between pairs of pads in order to move them apart and thus push them against the rod 202 while bearing against the inside wall of the sleeve 201. The pads 205 thus provide wedge-blocking, but unlike the sliding device shown in document FR 2 905 997, the blocking does not act directly in the sliding direction, but rather perpendicularly thereto.

The device includes link means between the sleeve 201 and the friction pad 205 in the form of conical studs 210 projecting from the inside wall of the sleeve 205 and engaged in half-cavities 211 including half-slopes, as can be seen in FIG. 7.

The device operates as follows. When an attempt is made to move the rod 202 relative to the sleeve 201, the rod 202 moves a little, entraining therewith the friction pads 205 until the conical obstacles 210 come into contact with one of the half-slopes in each of the half-cavities 211. By further increasing the force exerted on the rod 202, the obstacles 210 co-operating with the facing half-slopes force the pads 205 to move progressively away from the rod 202 against the thrust exerted by the springs 207 until the pads are far enough away to cease being able to retain the rod 202. The rod then moves relative to the sleeve 201 against an opposing friction exerted by the pads 205. The opposing friction force results from equilibrium being achieved by the pads 205 between the action of the conical obstacles 210 tending to move the pads 205 away from the rod 202 and the thrust exerted by the springs 207 tending to press the pads 205 against the rod 202.

Naturally, the number of facets on the rod could be decreased, or on the contrary increased. For example, it is possible to provide a rod that is triangular in section (three facets co-operating with six pads), or a rod that is hexagonal in section (six facets co-operating with twelve pads).

With reference to FIG. 8, and in accordance with a fourth particular embodiment of the invention, the device comprises a first element in the form of a body 301 having a second element, here a slider 302, mounted to slide therein in a sliding direction X, seen end-on in FIG. 8.

The friction member in this example comprises two bridges 305 arranged facing each other astride the slider 302. The bridges 305 have friction surfaces 306 that come into contact with friction surfaces having opposite slopes on either side of the slider 302.

In this example the presser member is in the form of spring washers 307 engaged on pull-rods 308 extending through the bridges 305. The spring washers 307 are thus arranged to urge the bridges 305 towards each other so as to clamp onto the slider 302.

The device includes link means between the body 301 and the bridges 305 in the form of balls 310 engaged firstly in semicircular half-cavities forming indentations in the flanks of the body 310, so as to project therefrom and be engaged in half-cavities 311 of diamond shape in the bridges 305.

The device operates as follows. When an attempt is made to move the slider 302 relative to the body 301, the slider 302 moves a little, entraining therewith the bridges 305 until the balls 310 come into contact with corresponding ones of the half-slopes of the half-cavities 311. By further increasing the force exerted on the slider 302, the balls 310 co-operating with the facing half-slopes force the bridges 305 to move progressively away from the slider 302 against the thrust exerted by the spring washers 307 until the bridges are spaced apart sufficiently to cease to be capable of retaining the slider 302. The slider then moves relative to the body 301 against an opposing friction force exerted by the bridges 305. The opposing friction force results from equilibrium being found by the bridges 305 between the action of the balls 310 tending to move the bridges 305 away from the slider 302, and the thrust from the spring washers 307 tending to press the bridges 305 against the slider 302.

In the embodiments shown, the obstacles (ball, roller, semicircle, cone, . . . ) serve both to hold the friction member against the first element and to move the friction member away from the second element. It is thus clear that the friction member is not initially in contact with the obstacles of the link means. It is appropriate to leave a certain amount of clearance, albeit small, but sufficient to ensure that the friction surface(s) of the friction member is/are indeed in contact with the second element. It is then only when the second element has moved initially entraining the friction member therewith that the friction member comes into contact with the obstacles of the link means and ends up by being moved away from the second element once the force imparted to the second element reaches or exceeds a threshold force that is set by the shape of the assembly and by the thrust exerted by the spring member.

The invention is not limited to the above description, but on the contrary covers any variant coming within the ambit defined by the claims.

In particular, although the link means described herein are obstacles (ball, roller, semicircle, cone, . . . ) arranged to co-operate with walls of a cavity in which the obstacles are engaged in order to cause the friction member to move perpendicularly to the sliding direction so as to separate the friction member from the second element, any other type of link means could be provided providing they serve to separate the friction member from the second element when the friction member moves relative to the first element. The link means could thus comprise cams that are forced to turn during said movement and that move the friction member away from the second element. They could also be electromagnetic means.

The invention claimed is:

1. A controlled-friction device comprising:
    a first element having a second element mounted thereon to slide in a sliding direction, and
    friction retaining means arranged to exert between the two elements an opposing force against relative movement of the two elements,
    wherein the friction retaining means comprises:
    a friction member mounted securely to the first element to rub against the second element via a friction surface extending parallel to the sliding direction; and
    a presser member for exerting a thrust force on the friction member, urging the friction member against the second element in a direction normal to the relative movement of the elements;
    wherein the retaining means comprise link means linking the friction member to the first element causing the friction member to separate from the second element during movement in either direction of the second element relative to the first element,
    wherein the first element is in the form of a sleeve, and the second element is in the form of a rod having facets, each of which has pads of the friction member rubbing thereagainst, and
    wherein the presser member comprises a plurality of springs extending between two adjacent pads.

2. The controlled friction device according to claim 1, wherein the link means include at least one obstacle interposed between the first element and the friction element, being engaged in a half-cavity therein, which half-cavity presents a wall shaped to cause the friction member to move perpendicularly to the sliding direction in order to cause separation of the friction member.

3. The controlled friction device according to claim 2, wherein the wall of the half-cavity presents two slopes, against each of which the obstacle comes to bear to separate the friction member during relative movement between the two elements, respectively in one direction or the other direction.

4. The controlled friction device according to claim 1, wherein the friction member comprises a wedge presenting a bearing surface bearing against the first element and forming an angle relative to the friction surface.

5. The controlled friction device according to claim 1, wherein the friction pads include circularly cylindrical bearing surfaces for bearing against an inside surface of the sleeve.

6. The controlled friction device according to claim 1, wherein the friction member comprises two bridges facing each other and urged towards each other by the presser member in order to clamp onto the second element.

* * * * *